US011157246B2

(12) United States Patent
Zhang et al.

(10) Patent No.: US 11,157,246 B2
(45) Date of Patent: Oct. 26, 2021

(54) CODE RECOMMENDER FOR RESOLVING A NEW ISSUE RECEIVED BY AN ISSUE TRACKING SYSTEM

(71) Applicant: INTERNATIONAL BUSINESS MACHINES CORPORATION, Armonk, NY (US)

(72) Inventors: Bo Zhang, Cary, NC (US); Ke Zhu, Cary, NC (US); Liwei Wang, Cary, NC (US); Chunhui Y. Higgins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 16/735,679

(22) Filed: Jan. 6, 2020

(65) Prior Publication Data
US 2021/0208855 A1 Jul. 8, 2021

(51) Int. Cl.
*G06F 8/36* (2018.01)
*G06F 11/07* (2006.01)

(52) U.S. Cl.
CPC ............ *G06F 8/36* (2013.01); *G06F 11/079* (2013.01); *G06F 11/0793* (2013.01)

(58) Field of Classification Search
CPC ....... G06F 8/36; G06F 11/079; G06F 11/0793
USPC ................................ 717/114–128
See application file for complete search history.

(56) References Cited

U.S. PATENT DOCUMENTS

| 6,029,002 | A | * | 2/2000 | Afifi | G06F 8/433 |
|---|---|---|---|---|---|
| | | | | | 714/E11.209 |
| 6,061,513 | A | * | 5/2000 | Scandura | G06F 8/74 |
| | | | | | 717/142 |
| 6,173,441 | B1 | * | 1/2001 | Klein | G06F 8/41 |
| | | | | | 704/9 |
| 6,539,348 | B1 | * | 3/2003 | Bond | G06F 16/30 |
| | | | | | 704/9 |
| 7,293,261 | B1 | * | 11/2007 | Anderson | G06F 8/52 |
| | | | | | 717/104 |
| 8,145,474 | B1 | * | 3/2012 | Daily | G06N 5/003 |
| | | | | | 704/9 |

(Continued)

OTHER PUBLICATIONS

Yan et al., "Are the Code Snippets What We Are Searching for? A Benchmark and an Empirical Study on Code Search with Natural-Language Queries", IEEE, pp. 344-354 (Year: 2020).*

(Continued)

*Primary Examiner* — Anil Khatri
(74) *Attorney, Agent, or Firm* — Amy J. Pattillo; Brian M. Restauro

(57) ABSTRACT

Training data identifying a plurality of pairs is received. Each pair identifies one or more separate code snippets known to resolve a respective issue of a plurality of issues. For each pair of the plurality of pairs, a respective issue representation of core content of the respective issue and a linear expression of the one or more separate code snippets in a respective code representation is constructed and a model to correlate the respective code representation as resolving the respective issue representation is trained. The model is queried with a new issue and a selected one of the one or more separate code snippets. The model returns a classification indicating whether the selected one of the one or more separate code snippets is likely to resolve the new issue.

20 Claims, 6 Drawing Sheets

(56) References Cited

U.S. PATENT DOCUMENTS

| | | | | |
|---|---|---|---|---|
| 8,166,348 | B1* | 4/2012 | Kulkarni | G06F 11/0793 714/38.1 |
| 8,266,594 | B2* | 9/2012 | Balasubramanian | G06F 8/33 717/125 |
| 8,434,056 | B2* | 4/2013 | Windley | G06F 9/541 717/106 |
| 8,572,560 | B2* | 10/2013 | Drissi | G06F 8/71 717/120 |
| 8,656,372 | B2* | 2/2014 | Vargas | G06F 8/51 717/137 |
| 8,694,831 | B2* | 4/2014 | Arapov | G06F 11/366 714/38.1 |
| 8,850,415 | B2* | 9/2014 | Huuck | G06F 11/3608 717/141 |
| 8,959,477 | B2* | 2/2015 | Mueller | G06F 9/45512 717/106 |
| 9,383,973 | B2* | 7/2016 | Villar | G06F 8/33 |
| 9,519,464 | B2 | 12/2016 | Dang et al. | |
| 9,535,664 | B1* | 1/2017 | Foster | G06F 8/427 |
| 9,864,586 | B2 | 1/2018 | Kaulgud et al. | |
| 9,898,280 | B2 | 2/2018 | Balachandran | |
| 9,952,837 | B1* | 4/2018 | Maclay | G06F 8/35 |
| 9,965,633 | B2 | 5/2018 | Brucker et al. | |
| 10,048,945 | B1* | 8/2018 | Makkar | G06F 8/36 |
| 10,089,213 | B1 | 10/2018 | Noble et al. | |
| 10,275,334 | B1 | 4/2019 | Lininger et al. | |
| 2016/0274997 | A1 | 9/2016 | Kachko et al. | |
| 2017/0192956 | A1 | 7/2017 | Kaiser et al. | |
| 2017/0364744 | A1 | 12/2017 | Savehenkov et al. | |
| 2018/0024816 | A1 | 1/2018 | Au et al. | |
| 2018/0150742 | A1 | 5/2018 | Woulfe et al. | |
| 2019/0026106 | A1 | 1/2019 | Burton et al. | |

OTHER PUBLICATIONS

Yin et al, "Learning to Mine Aligned Code and Natural Language Pairs from Stack Overflow", ACM, pp. 476-486 (Year: 2018).*

Merten et al, "Software Feature Request Detection in Issue Tracking Systems", IEEE, pp. 166-175 (Year: 2016).*

Horton et al, "DockerizeMe: Automatic Inference of Environment Dependencies for Python Code Snippets", IEEE, pp. 328-338 (Year: 2019).*

Yang et al., "From Query to Usable Code: An Analysis of Stack Overflow Code Snippets", ACM, pp. 391-401 (Year: 2016).*

Galenlson et al, "CodeHint: Dynamic and Interactive Synthesis of Code Snippets", ACM, pp. 653-663 (Year: 2014).*

Zhang et al, "A Novel Neural Source Code Representation Based on Abstract Syntax Tree", IEEE, pp. 783-787 (Year: 2019).*

Panchenko et al., "Precise and Scalable Querying of Syntactical Source Code Patterns Using Sample Code Snippets and a Database", IEEE, pp. 41-50 (Year: 2011).*

Wehr et al.; "Learning Semantic Vector Representations Of Source Code Via A Siamese Neural Network", Cornell University Library, arXiv: 1904.11968v1, pp. 1-6, Apr. 26, 2019, 6 pages.

Hajiaghayi et al., "Code Failure Prediction And Pattern Extraction Using LSTM Networks", Cornell University Library, arXiv:1812.05237v1, pp. 1-8, Dec. 2018, 8 pages.

Hu et al.; "Deep Code Comment Generation", ICPC'18 ACM International Conference On, pp. 1-11, May 27-28, 2018, 11 pages.

Lipton et al.; "Learning To Diagnose With LSTM Recurrent Neural Networks", Cornell University Library, arXiv:1511.03677v7, pp. 1-18, Mar. 21, 2017, 18 pages.

Gu et al., "Deep Code Search", ICSE '18, Proceedings on the 40th International Conference on Software Engineering, pp. 933-944, May 27-Jun. 3, 2018, Sweden, 12 pages.

Tufano et al., "Deep Learning Similarities from Different Representations of Source Code", MSR '18, May 28-29, 2018, Sweden, 12 pages.

Mou et al,, "Convolutional Neural Networks over Tree Structures for Programming Language Processing", Proceedings of the 13th AAAI Conference on Artificial Intelligence, Feb. 12-17, 2016, pp. 1287-1293, 7 pages.

Dam et al., "A deep tree-based model for software defect prediction", arXiv: 1802.00921 [cs.SE], Feb. 3, 2018, 10 pages.

Hu et al., "Deep Code Comment Generation", ICPC '18 Proceedings of the 26th Conference on Program Comprehension, pp. 200-210, May 27-28, 2018, Sweden, 11 pages.

White et al., "Deep Learning Code Fragments for Code Clone Detection", ASE '16, Sep. 3-7, 2016, Singapore, 12 pages.

* cited by examiner

CODE RECOMMENDER FOR RESOLVING A NEW ISSUE RECEIVED BY AN ISSUE TRACKING SYSTEM

BACKGROUND

1. Technical Field

One or more embodiments of the invention relate generally to data processing and particularly to recommending code for resolving a new issue received by an issue tracking system.

2. Description of the Related Art

Software developers frequently implement an issue tracking system to organize the tracking and resolution of issues that occur during software development.

BRIEF SUMMARY

In one embodiment, training data identifying a plurality of pairs is received. Each pair identifies one or more separate code snippets known to resolve a respective issue of a plurality of issues. For each pair of the plurality of pairs, a respective issue representation of core content of the respective issue and a linear expression of the one or more separate code snippets in a respective code representation is constructed and a model to correlate the respective code representation as resolving the respective issue representation is trained. The model is queried with a new issue and a selected one of the one or more separate code snippets. The model returns a classification indicating whether the selected one of the one or more separate code snippets is likely to resolve the new issue.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive training data identifying a plurality of pairs, each pair identifying one or more separate code snippets known to resolve a respective issue of a plurality of issues. The stored program instructions comprise program instructions to, for each pair of the plurality of pairs: construct a respective issue representation of core content of the respective issue; construct a linear expression of the one or more separate code snippets in a respective code representation; and train a model to correlate the respective code representation as resolving the respective issue representation. The stored program instructions comprise program instructions to query the model with a new issue and a selected one of the one or more separate code snippets, wherein the model returns a classification indicating whether the selected one of the one or more separate code snippets is likely to resolve the new issue.

In another embodiment, a computer program product comprises one or more computer readable storage media having program instructions collectively stored thereon, wherein the one or more computer readable storage media are not a transitory signal per se. The program instructions are executable by a computer to cause the computer to receive, by a computer, training data identifying a plurality of pairs, each pair identifying one or more separate code snippets known to resolve a respective issue of a plurality of issues. The program instructions are executable by a computer to cause the computer to, for each pair of the plurality of pairs: construct, by the computer, a respective issue representation of core content of the respective issue; construct, by the computer, a linear expression of the one or more separate code snippets in a respective code representation; and train, by the computer, a model to correlate the respective code representation as resolving the respective issue representation. The program instructions are executable by a computer to cause the computer to query, by the computer, the model with a new issue and a selected one of the one or more separate code snippets, wherein the model returns a classification indicating whether the selected one of the one or more separate code snippets is likely to resolve the new issue.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention.

It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
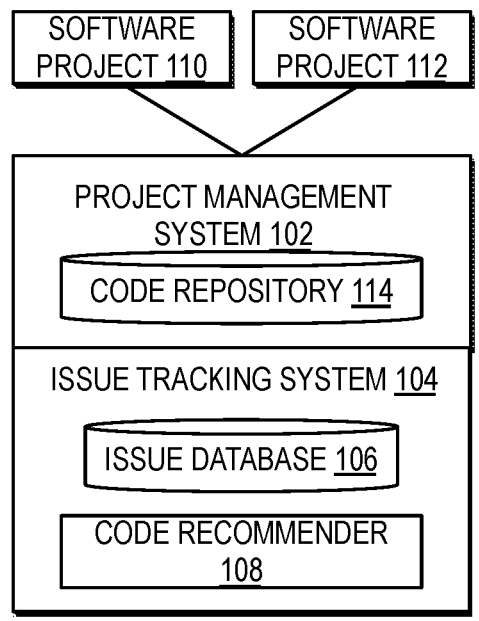
FIG. 1 illustrates a block diagram of one example of a code recommender of an issue tracking system for recommending a previous code snippet to resolve a new issue received by the issue tracking system.

FIG. 1 illustrates a block diagram of one example of a code recommender of an issue tracking system for recommending a previous code snippet to resolve a new issue received by the issue tracking system.

In one example, to manage software development projects that include large volumes of code and may include multiple contributors, a developer or organization may implement one or more project management applications to provide centralized tracking and coordination of workflows of development tasks across one or more software development projects, such as a project management system 102. For example, project management system 102 may support tracking and coordination of workflows where multiple developers contribute to writing or modifying computer code, which may include merging or branching versions of the code. In the example, project management 102 includes a code repository 114, which manages source code committed by one or more developers and version controls showing a history of a project, from a first commit to a most recent change. In the example, project management system 102 supports management of a software project 110 and a software project 112. In additional or alternate embodiments, project management system 102 may support a single software project or may support additional or alternate software projects.

One of the functions of project management system 102 includes, but is not limited to, an issue tracking system 104. Issue tracking system 104 supports tracking issues reported during code development of one or more of software project 110 and software project 112, such as tracking software bugs and other errors. In one example, issue tracking system 104 manages and maintains an issue database 106 that includes records for issues and facts about the known issues. For example, issue tracking system 104 may maintain issue database 106 with a list of issues, status, and facts. In one example, a status may indicate that the issue is newly reported, in progress of being resolved, or resolved. In one example, facts may include additional information about the issue including, but not limited to, the time and issue was reported, the severity of the issue, the erroneous program behavior, details on how to reproduce the issue, the identity of the developer who reported the issue, and the identities of any developers who are working to fix the issue.

In one example, it is common for many of the issues tracked in issue database 106 to be similar, either as duplicative of one another, overlapping, or caused by one another. In particular, in any software project, there is a possibility of duplicated code that is identical, through a copy and paste of code from one area of the project to another or from a previous software project into a new software project, or that is modified from a copy of code, such as code that has been copied from another portion of a same project or another project and then modified, but functions similarly. In an organization, duplicated code may result from developers recreating similar libraries and tools within a same software project or across multiple software projects. If duplicated code appears throughout a software project and the code has an issue, then all duplications of the code are likely to have a similar issue. In addition, issues may be similar in response to other factors present during code development such as, but not limited to, recurring programming errors by a developer, software complexity, recurring ambiguity in requirements for code, changing requirements, bugs introduced during rework, bugs in software development tools, and a lack of communication In one example, for issue tracking system 104 to effectively track the status of issues, the system may require input from a developer to search through a list of issue reports displayed in an interface, reflecting records of issue database 106, select to debug a section of code to resolve the issue, and then provide an input through the interface to identify that an issue has been resolved by a particular code version. In one example, while issue tracking system 104 provides an important tracking and management function for improving the efficiency of development of a software project by providing developers with a list of issues that need to be addressed through debugging in an organized manner, issues that are resolved by similar code snippets still have to be separately debugged, reviewed, and maintained by current or future developers, including developers taking time to identify code for debugging, debut the code, and commit code to resolve each issue entry, which decreases workflow efficiency.

According to an advantage of the present invention, issue tracking system 104 provides a code recommender 108 that improves workflow efficiency for developers responding to issues that may be resolved by previously committed code snippets. Code recommender 108 trains a model to identify what makes code snippets resolve an issue, based on the training using labeled data with sets of code snippets used to resolve previous issues. In response to receiving a new issue, code recommender 108 of issue tracking system 104 analyzes the new issue, using the model, to identify and recommend existing source code snippets likely to resolve the new issue.

Figure 2:
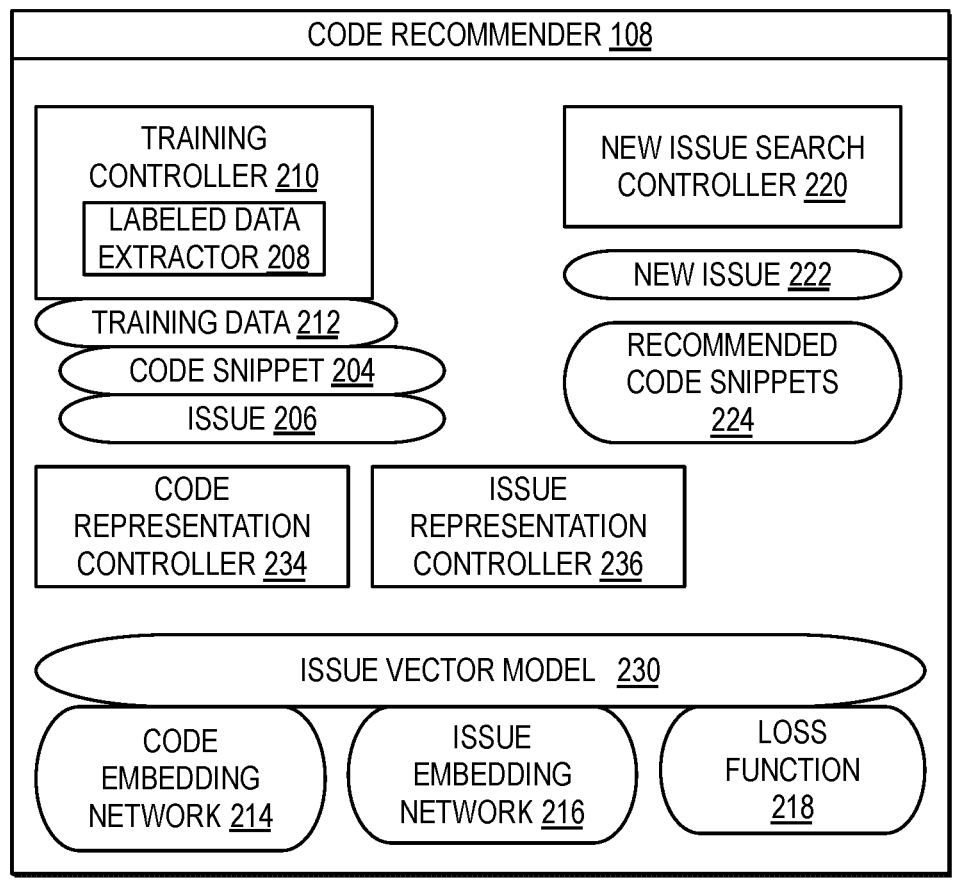
FIG. 2 illustrates a block diagram of one example of components of a code recommender of an issue tracking system for recommending previous code snippets for resolving a new issue.

FIG. 2 illustrates a block diagram of one example of components of a code recommender of an issue tracking system for recommending previous code snippets for resolving a new issue.

In one example, code recommender 108 implements a training controller 210 using supervised learning for training deep learning models, such as training an issue vector model 230. In the example, training controller 210 jointly embeds representations of code snippets and representations of natural language descriptions of issues into a high-dimensional vector space of issue vector model 230, in such a manner that issues resolved by a code snippet have corresponding vectors that are similar.

In particular, in one example, issue vector model 230 represents a deep learning model support by a long short-term memory (LSTM) based on a recurrent neural network (RNN) architecture. In one example, issue vector model 230 is trained in a supervised fashion, on a set of training of code snippets known to resolve issues, using an optimization algorithm in order to change each weight of the LSTM network in proportion to a derivative error. In one example, training controller 210 determines the derivative error through a loss function 218.

In one embodiment, to acquire the training examples for training issue vector model 230, training controller 210 implements a labeled data extractor 208 for extracting training data 212, representing a set of training examples, for training issue vector model 230. In another embodiment, training controller 210 may receive training data 212 from user input or one or more other sources, in addition to or as an alternative to labeled data extracted by labeled data extractor 208.

In particular, in one example, training data 212 includes sets of training examples where each training example is a pair including a code snippet 204 and an issue 206, which are each labeled as being examples of a code snippet identified as resolving the issue. In one example, labeled data extractor 208 retrieves training data 212 based on the linkage between a set of issues resolved in issue database 106 in response to a particular code version and code commits in code repository 114 that are part of the code version that resolved the issues. For example, labeled data extractor 208 may retrieve issues resolved in relation to a current code commit in issue database 106, obtain a current code commit to code repository 114, identify the code changes in the current code commit in comparison with a previous code commit, and link the set of issues resolved in the current code commit with the code change snippets identified. Labeled data extractor 208 may perform additional analysis or tracking to identify particular code change snippets in a code commit with particular issues resolved by the code commit.

In the example, within each pair of code snippet 204 and issue 206 in training data 212, labeled data extractor 208 may label the code snippet and issue as the input and a logical indication that code snippet resolves the issue as the output. Training controller 210 trains issue vector model 230 based on labeled data 212 using supervised training to model relationships and dependencies between the code snippet resolving the issue such that issue vector model 230 may then predict code snippets that would resolve new issues based on the relationships learned in issue vector model 230 from the training data 212.

In particular, in the example, training controller 210 generates a representation of each pair of training data 212 to feed into components of issue vector model 230. For example, training controller 210 calls a code representation controller 234 to generate a representation of a code snippet in a pair and then feeds the code snippet representation to a code embedding network 214 of issue vector model 230. In addition, in the example, training controller 210 calls an issue representation controller 236 for constructing a representation of an issue in the pair and then feeds the issue representation to an issue embedding network 216 of issue vector model 230.

In one example, code representation controller 234 may generate a code representation by flattening the source code for the code snippet from an internal structure in an abstract syntax tree into a linear sequence of words. For example, code representation controller 234 generates the code representation by first parsing a code snippet into an abstract syntax tree (AST) and then creating a structured-based traversal representation by traversing the AST in depth-first order to produce a sequence of tokens, and constructing a vocabulary of frequently occurring tokens found in ASTs, also filtering out all tokens occurring below a certain frequency threshold and replacing them with an generic token of "<UNK>". In one example, in filtering out all tokens occurring below a certain frequency threshold, code embedding network 214 may apply a frequency threshold as a percentage of all tokens or as a fixed number.

In the example, issue representation controller 236 may generate an issue representation by analyzing the issue using natural language understanding, with results of core contents of the issue, with relevant scores and sentiment values. For example, issue representation controller 236 may apply one or more natural language understanding components for applying a lexicon of language, with a parser and grammar rules, to break the text language in an issue into the core contents of the issue with probability scores. In addition, for example, issue representation controller 236 may apply one or more natural language understanding components for evaluating semantics of the text language with sentiment values. The natural language understanding results become inputs for effectively clustering similar issues.

In the example, in response to receiving a code representation from code representation controller 234, code embedding network 214 encodes a representation of a code snippet to learn a vector representation of the code snippet, in such a manner that similar code snippet entries have vectors close to each other, and issue embedding network 216 encodes a representation of an issue to learn a vector representation of the issue, in such a manner that similar issue entries have vectors close to each other. For example, to manage embedding, training controller 210 feeds pairs of a code representation "<c>" from code representation controller 234 and an issue representation "<i>" from issue representation controller 236 into encoding interfaces of issue vector model 230 illustrated by code embedding network 214 and issue embedding network 216, respectively. Code embedding network 214 receives code representation "<c>" and produces a fixed-size vector "<v1>" as output and issue embedding network 216 receives issue representation "<i>" and produces a fixed sized vector "<v2>" as output. In one example, "<v1>" and "<v2>" are each real-valued vectors of n dimensions.

In particular, in the example, code embedding network 214 and issue embedding network 216 each represent LSTM-based RNN networks with hidden layers used recurrently for computation, which creates a record of dynamic temporal behaviors within an internal state of the neural network. In one example, each LSTM-based RNN includes three layers such as an input layer that maps each input to a vector, a recurrent hidden layer that recurrently computes and updates a hidden state after reading each input, and an output layer that utilizes the hidden state for specific tasks, to embed a natural language representation into a vector.

In the example, training controller 210 trains the deep neural networks of issue vector model 230 using one or more types of optimization algorithms, which apply a loss function to estimate the loss of issue vector model 230 so that weights can be updated to reduce the loss during a next evaluation during training. In the example, loss function 218 is designed to take a distance between two vectors, such as "<v1>" and "<v2>", corresponding to code "<c>" and issue "<i>", and produces an output of a loss $1(d)$, where "d" is the distance between a pair of code and the issue. In the example, the distance "d" may represent a distance metric, such as, but not limited to, an angular distance, Euclidean, and Manhattan. In one example, loss function 218 produces an output of a loss inverse to the distance between "<v1>" and "<v2>", in response to code "<c>" not resolving issue "<i>". In another example, loss function 218 produces an output of a loss proportional to the distance between "<v1>" and "<v2>", in response to code "<c>" resolving issue "<i>".

In the example, training controller 210 trains code embedding network 214 and issue embedding network 216 of issue vector model 230 using by loss function 218 to minimize the loss. In the example, when loss is minimized, codes that solve similar issues will produce vectors that are close in distance and codes that solve dissimilar issues will produce vectors that are far in distance. In one example, loss function 218 penalizes low distances when the code is not resolving the issue and high distances when the code is resolving the issue.

In the example, in response to training controller 210 completing training of issue vector model 230 by applying training data 212, training controller 210 may also test issue vector model 230 using one or more selected pairs from training data 212 or using one or more other data sets of labeled training data. In the example, when training controller 210 completes training and testing of issue vector model 230, training controller 210 enables issue vector model 230 to perform one or more functions, such as classification.

In one example, in response to code recommender 108 receiving a new issue 222, a new issue search controller 220 of code recommender 108 searches issues vector model 230 with one or more of the existing code snippets from training data 212 and new issue 222. In one example, new issue search controller 220 may first apply code representation controller 234 to construct a code representation of the existing code snippets and apply issue representation controller 236 to generate an issue representation for new issue 222, then submit the code representation and issue representation to issue vector model 230.

In the example, issue vector model 230 may evaluate the code representation and issue representation and return a classification value with a probability indicating the likelihood the existing code snippet would resolve new issue 222. New issue search controller 220 selects from among one or more existing code snippets with a highest probability and returns the resulting recommended code snippet to a developer as recommended code snippet 224.

According to an advantage of the present invention, by training controller 210 converting both code snippet 204 and issue 206 from different types of input formats of different lengths of data, into vector forms that can be compared in distance, training controller 210 supports training issue vector model 230 to efficiently and effectively learn which previous code snippets are likely to resolve any new issue. According to an advantage of the invention, new issue search controller 220 supports natural language processing and text classification of volumes of text that are large, such as millions of lines of code, where a person attempting to review the same volume of previous versions of code and evaluate which previous versions of code might resolve a new issue would require significant amounts of time to reach a same conclusion that issue vector model 230 is capable of performing in increments of a second or less. According to an advantage of the invention, new issue search controller 220 automatically determines a selection of one or more previous code snippets that are likely to resolve a new issue identified in issue database 106 and prompts a developer with the predicted code snippet to reduce the time required for a developer to debug code issues tracked in issue database 106 and improve workflow efficiency.

Figure 3:
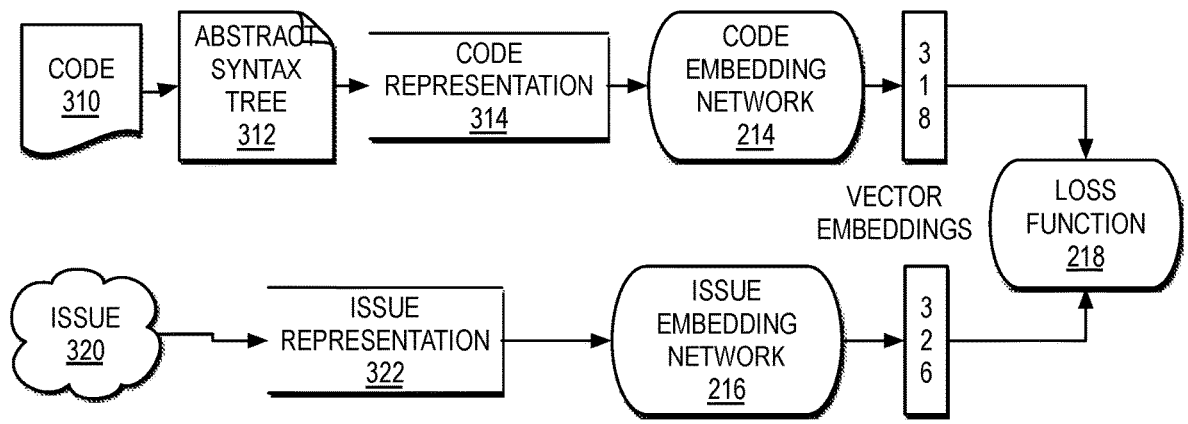
FIG. 3 illustrates a block diagram of one example of components of a training controller of a code recommender of an issue tracking system for training an issue vector model to recommend previous code snippets for resolving a new issue.

FIG. 3 illustrates a block diagram of one example of components of a training controller of a code recommender of an issue tracking system for training an issue vector model to recommend previous code snippets for resolving a new issue.

In one example, training controller 210 trains issue vector model 230 with labeled training data that are identified as code that resolves an issue, using sets of code snippet and issue pairings, such as a code snippet illustrated by code 310 and an issue 320. In one example, training controller 210 may train issue vector model 230 with different sets of a same code snippet in code 310 and different issues paired with the code snippet in issue 320 based on code commits. In another example, training controller 210 may train issue vector model 230 with different sets of different code snippets in code 310 with different issues paired with the code snippet in issue 320 based on code commits.

In one example, the types of text in code 310 and issue 320 differ, therefore training controller 210 manages construction of a representation of each of code 310 and issue 320 differently. For example, code representation controller 234 parses an abstract syntax tree 312 of code 310 and then uses a structured-based traversal of abstract syntax tree 312 to generate a structure-based traversal representation of code 310, illustrated by code representation 314. In addition, issue representation controller 236 applies natural language understanding components to issue 320 to generate issue representation 322 with core content of the issue, with relevant scores and sentiment values.

In the example, training controller 210 feeds the pair of code representation 314 into an code embedding network 214 and issue representation 322 into an issue embedding network 216 to train each network. In the example, code embedding network 214 encodes code representation 314 in the LSTM-based RNN and generates a vector embedding 318 representing a numerical vector of code 310. In addition, in the example, issue embedding network 216 encodes issue representation 316 in the LSTM-based RNN and generates a vector embedding 326 representing a numerical vector of issue 320.

In the example, vector embedding 318 and vector embedding 326 are applied to loss function 218. In the example, loss function 218 outputs a loss inverse to the distance between vector embedding 318 and vector embedding 326 in response to code 310 not resolving issue 320 and loss function 218 outputs a loss proportional to the distance between vector embedding 318 and vector embedding 326 in response to code 310 resolving issue 320. In the example, loss function 218 trains issue vector model 230 by adjusting the weights in code embedding network 214 and issue embedding network 216 to minimize the loss distance between pairs of code and issues produced by issue vector model 230.

Figure 4:
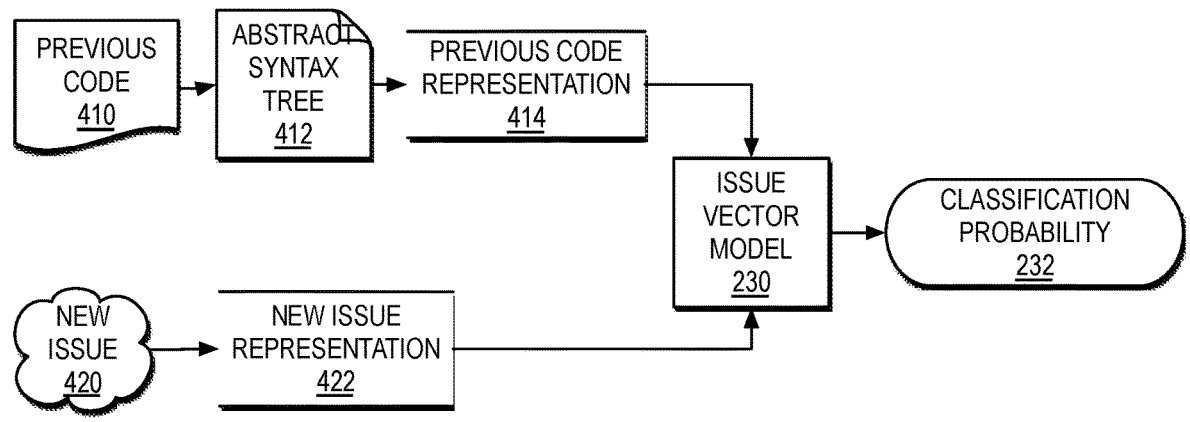
FIG. 4 illustrates a block diagram of one example of components of a search controller of a code recommender of an issue tracking system for searching an issue vector model to obtain a recommend previous code snippets for resolving a new issue.

FIG. 4 illustrates a block diagram of one example of components of a search controller of a code recommender of an issue tracking system for searching an issue vector model to obtain a recommend previous code snippets for resolving a new issue.

In one example, new issue search controller 220 prepares a "code, issue" input pair based on existing code snippets, illustrated as previous code 410, and a new issue, illustrated as new issue 420. In the example, new issue search controller 220 accesses previous code 410 from training data 212. In the example, new issue search controller 220 first passes previous code 410 to code representation controller 234, which parses an abstract syntax tree 412 of previous code 410 and then uses a structured-based traversal of abstract syntax tree 412 to generate a structure-based traversal representation of previous code 410, illustrated by previous code representation 414. In addition, new issue search controller 220 first passes new issue 420 to issue representation controller 236, which applies natural language understanding components to issue 420 to generate new issue representation 422 with core content of the issue, with relevant scores and sentiment values.

In the example, new issue search controller 220 enters previous code representation 414 and new issue representation 422 as the "code, issue" inputs to issue vector model 230. In the example, issue vector model 230 applies previous code representation 414 and new issue representation 422 to the LSTM based RNN model and determines a probability that the previous code would resolve the new issue. In the example, issue vector model 230 returns the probability, which may represent a number between 0 and 1, as a classification probability 232.

Figure 5:
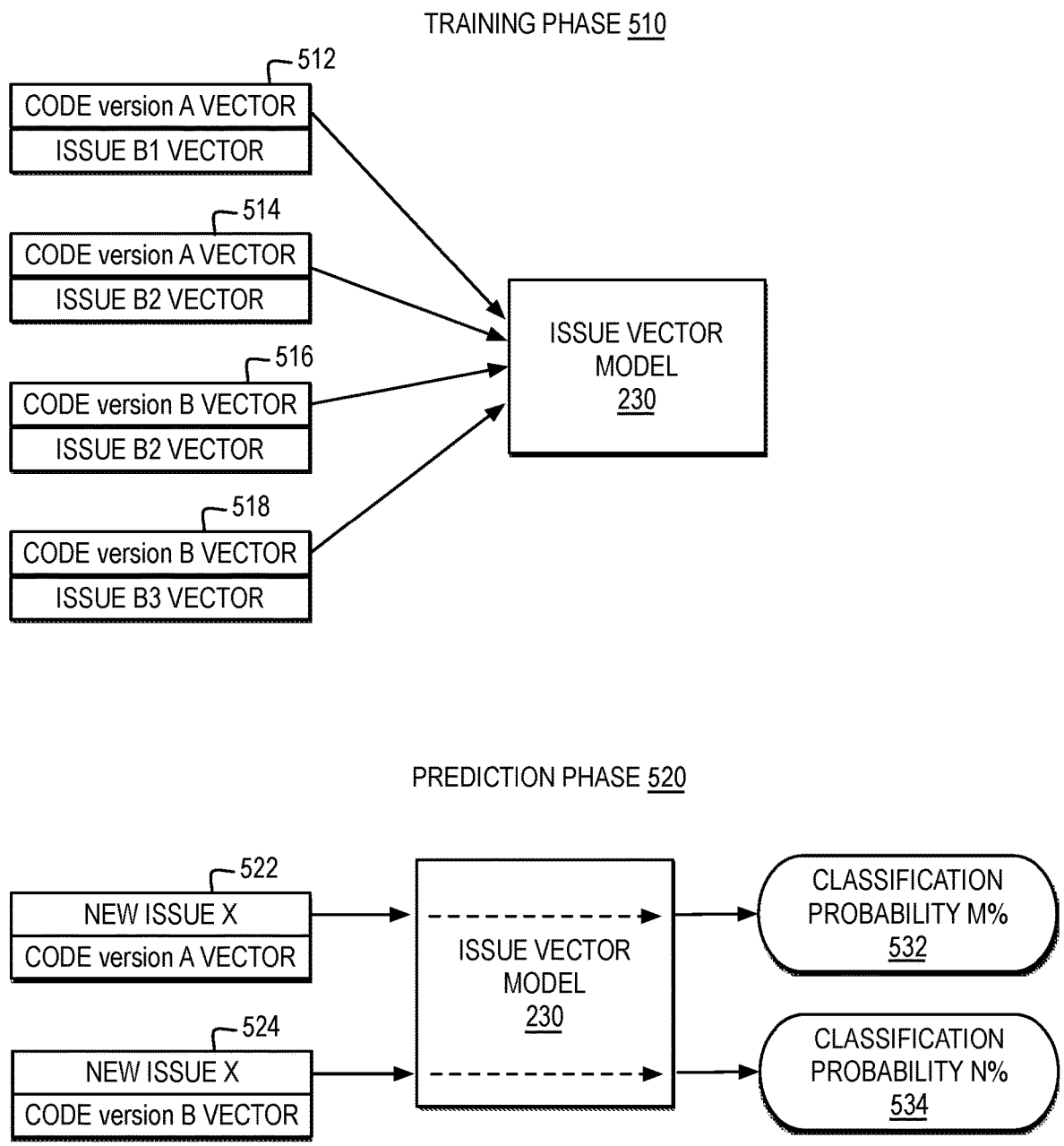
FIG. 5 illustrates a block diagram of one example training data applied by a code recommender of an issue tracking system for training an issue vector model to recommend previous code snippets for resolving a new issue and a resulting prediction by the issue vector model of a previous code snippet that may resolve a new issue.

FIG. 5 illustrates a block diagram of one example training data applied by a code recommender of an issue tracking system for training an issue vector model to recommend previous code snippets for resolving a new issue and a resulting prediction by the issue vector model of a previous code snippet that may resolve a new issue.

In the example illustrated in FIG. 5, during a training phase 510, code recommender 108 trains issue vector model 230 with a training set of multiple data pairs, where each data pair includes a code snippet version vector and an issue vector. For example, a data pair 512 includes a code snippet "code version A vector" and an issue "issue B1 vector" and a data pair 514 includes a code snippet "code version A vector" and an issue "issue B2 vector". In addition, for example, a data pair 516 includes a code snippet "code version B vector" and an issue "issue B2 vector" and a data pair 518 includes a code snippet "code version B vector" and an issue "issue B3 vector". Issue vector model 230 is trained using data pair 512, data pair 514, data pair 516, and data pair 518, for example as illustrated in FIG. 3.

In the example illustrated in FIG. 5, during a prediction phase 520, code recommender 108 constructs one or more data pairs, each including a new issue paired with a previous code snippet used to train issue vector model 230, submits the constructed pairs to issue vector model 230, and receives a classification probability for each data pair from issue vector model 230. For example, for a "new issue X", code recommender 108 submits a data pair 522 with the issue "new issue X" paired with previous code "code version A vector" and submits a data pair 524 with the issue "new issue X" paired with previous code "code version B vector". In the example, for data pair 522, issue vector model 230 generates a classification probability M % 532, with a percentage probability that the code identified by "code version A vector" would resolve "new issue X" and for data pair 524, issue vector model 230 generates a classification probability N % 534, with a percentage probability that the code identified by "code version B vector" would resolve "new issue X". In one example, code recommender 108 evaluates whether the "M %" or "N %" exceeds a threshold indicating a likelihood that the previous code snippet would resolve the new issue and returns a selection of any code snippets with classification probability percentages that exceed the threshold.

Figure 6:
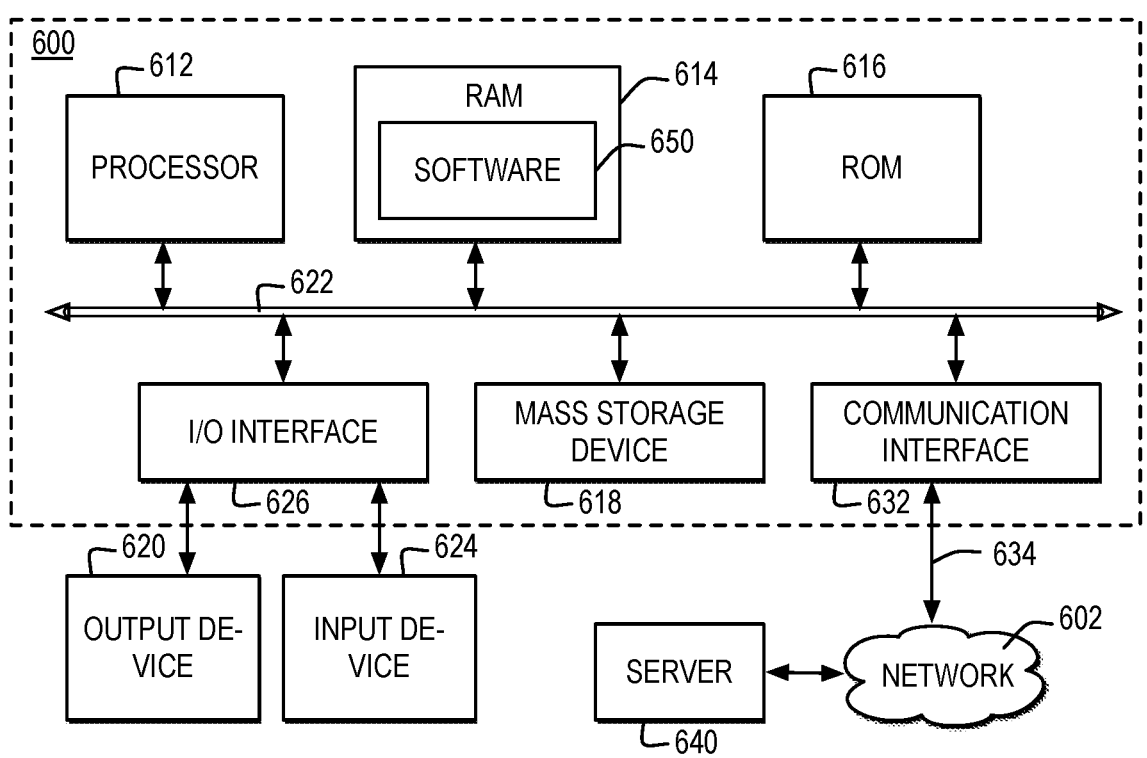
FIG. 6 illustrates one example of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. When implemented as a server or node, computer system 600 may include multiple processors designed to improve network servicing power.

Processor 612 may be at least one general-purpose processor that, during normal operation, processes data under the control of software 650, which may include at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. Software 650 may include, but is not limited to, code, applications, protocols, interfaces, and processes for controlling one or more systems within a network including, but not limited to, an adapter, a switch, a server, a cluster system, and a grid environment.

Computer system 600 may communicate with a remote computer, such as server 640, or a remote client. In one example, server 640 may be connected to computer system 600 through any type of network, such as network 602, through a communication interface, such as network interface 632, or over a network link that may be connected, for example, to network 602.

In the example, multiple systems within a network environment may be communicatively connected via network 602, which is the medium used to provide communications links between various devices and computer systems communicatively connected. Network 602 may include permanent connections such as wire or fiber optics cables and temporary connections made through telephone connections and wireless transmission connections, for example, and may include routers, switches, gateways and other hardware to enable a communication channel between the systems connected via network 602. Network 602 may represent one or more of packet-switching based networks, telephony-based networks, broadcast television networks, local area and wire area networks, public networks, and restricted networks.

Network 602 and the systems communicatively connected to computer 600 via network 602 may implement one or more layers of one or more types of network protocol stacks which may include one or more of a physical layer, a link layer, a network layer, a transport layer, a presentation layer, and an application layer. For example, network 602 may implement one or more of the Transmission Control Protocol/Internet Protocol (TCP/IP) protocol stack or an Open Systems Interconnection (OSI) protocol stack. In addition, for example, network 602 may represent the world-wide collection of networks and gateways that use the TCP/IP suite of protocols to communicate with one another. Network 602 may implement a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

Figure 7:
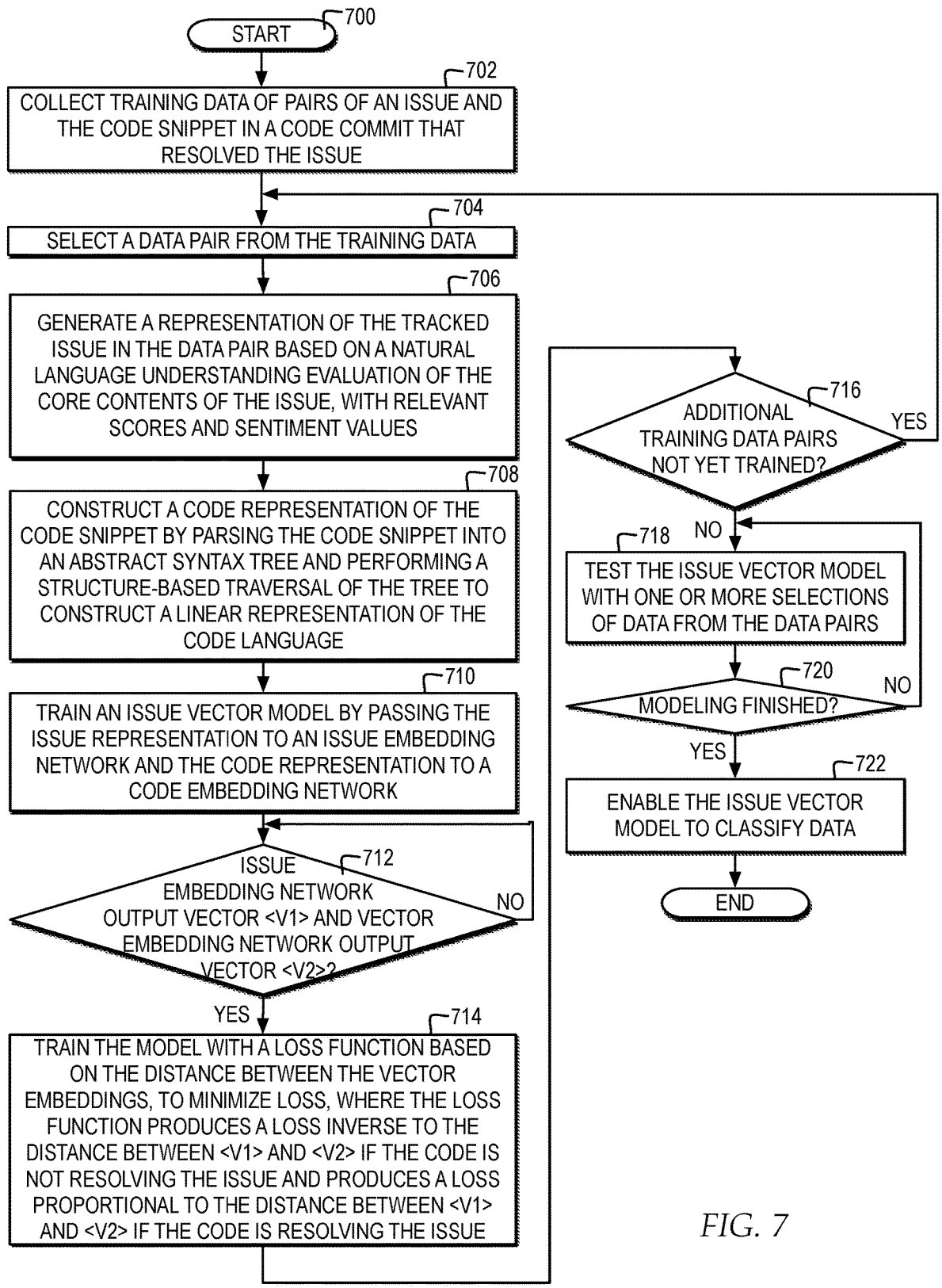
FIG. 7 illustrates a high-level logic flowchart of a process and computer program for training an issue vector model to recommend previous code snippets for resolving a new issue.
Figure 8:
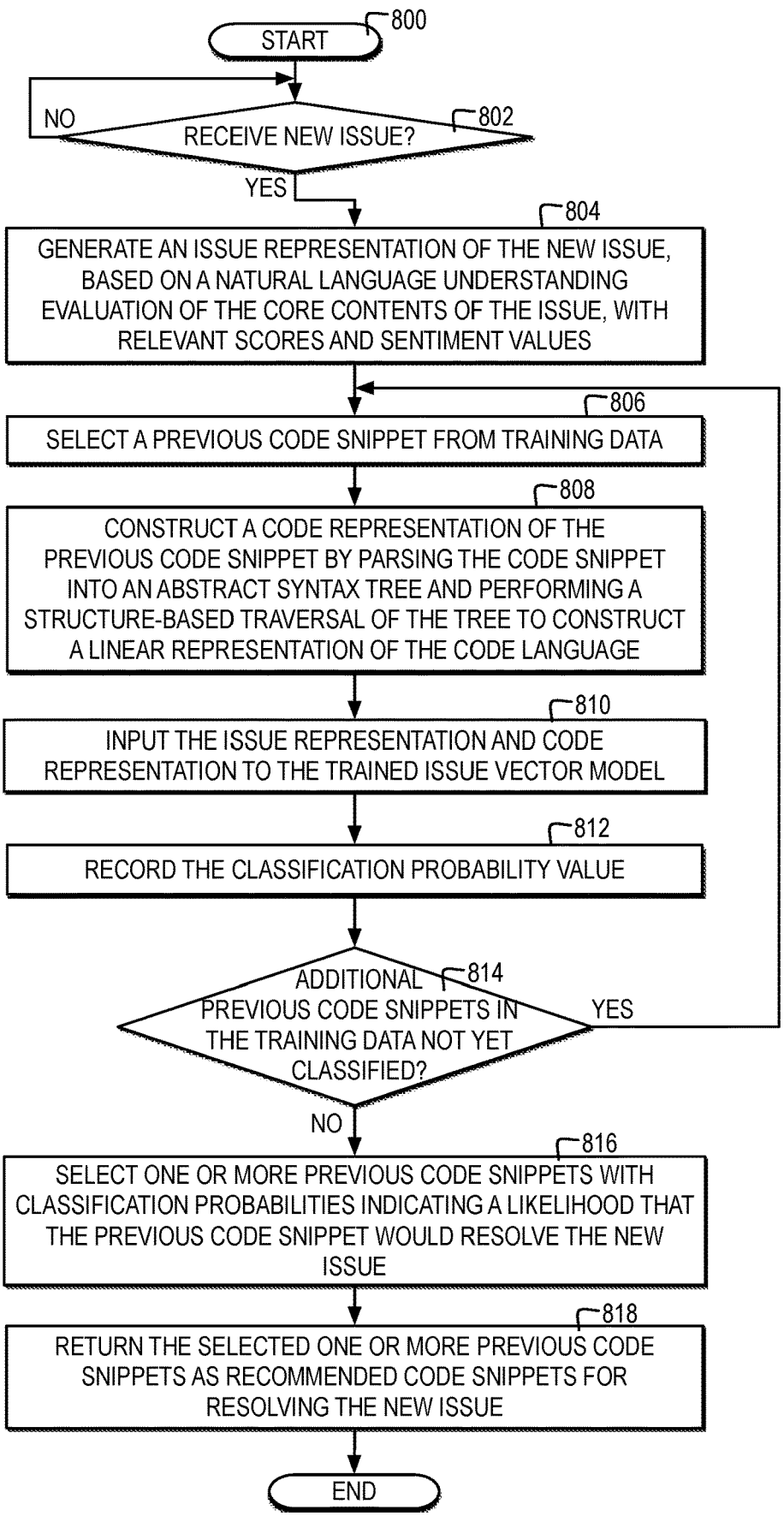
FIG. 8 illustrates a high-level logic flowchart of a process and computer program for querying an issue vector model to obtain a recommend previous code snippets for resolving a new issue.

In one embodiment, the operations performed by processor 612 may control the operations of flowchart of FIGS. 7-8 and other operations described herein. Operations performed by processor 612 may be requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, may contain hardwired logic for performing the operations of flowchart in FIGS. 7-8.

In addition, computer system 600 may include multiple peripheral components that facilitate input and output. These peripheral components are connected to multiple controllers, adapters, and expansion slots, such as input/output (I/O) interface 626, coupled to one of the multiple levels of bus 622. For example, input device 624 may include, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs may include, for example, one or more graphical display devices, audio speakers, and tactile detectable output interfaces, but may also include other output interfaces. In alternate embodiments of the present invention, additional or alternate input and output peripheral components may be added.

With respect to FIG. 6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely, propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 6 may vary. Furthermore, those of ordinary skill in the art will appreciate that the depicted example is not meant to imply architectural limitations with respect to the present invention.

FIG. 7 illustrates a high-level logic flowchart of a process and computer program for training an issue vector model to recommend previous code snippets for resolving a new issue.

In one example, the process and computer program starts at block 700 and thereafter proceeds to block 702. Block 702 illustrates collecting training data of pairs of an issue and the code snippet in a code commit that resolved the issue. Next, block 704 illustrates selecting a data pair from the training data. Thereafter, block 706 illustrates generating an issue representation of the issue in the pair, based on a natural language understanding the valuation of the core contents of the issue, with relevant scores and sentiment values. Next, block 708 illustrates constructing a code representation of the code snippet by parsing the code snippet into an abstract syntax tree and performing a structure-based traversal of the tree to construct a linear representation of the code language. Thereafter, block 710 illustrates training an issue factor model by passing the issue representation to an issue embedding network and the code representation to a code embedding network. Next, block 712 illustrates a determination whether the issue embedding network outputs a vector <V1> and the vector embedding network outputs a vector <V2>. Thereafter, block 714 illustrates training the model with a loss function based on the distance between the vector embeddings <V1> and <V2>, to minimize loss, where the loss function produces a loss inverse to the distance between <V1> and <V2> if the code is not resolving the issue and where the loss function produces a loss proportional to the distance between <V1> and <V2> if the code is resolving the issue, and the process passes to block 716.

Block 716 illustrates a determination whether there are additional training data pairs that are not yet trained. At block 716, if there are additional training data pairs not yet trained, the process returns to block 704. At block 716, if there are not additional training data pairs not yet trained, the process passes to block 718. Block 718 illustrates testing the issue vector model with one or more selections of data from the data pairs. Next, block 720 illustrates a determination whether the modeling is finished. At block 720, if the modeling is not yet finished, for example if additional training and testing is needed, then the process returns to block 718, or may restart at block 702. At block 720, if the modeling is finished, then the process passes to block 722. Block 722 illustrates enabling the issue vector model to classify data, and the process ends.

FIG. 8 illustrates a high-level logic flowchart of a process and computer program for querying an issue vector model to obtain a recommend previous code snippets for resolving a new issue.

In one example, the process and computer program start at block 800 and thereafter proceed to block 802. Block 802 illustrates a determination whether a new issue is received. At block 802, if a new issue is received, then the process passes to block 804. Block 804 illustrates generating an issue representation of the new issue, based on a natural language understanding evaluation of the core contents of the issue, with relevant scores and sentiment values. Next, block 806 illustrates selecting a previous code snippet from training data. Thereafter, block 808 illustrates constructing a code representation of the previous code snippet by parsing the code snippet into an abstract syntax tree and performing a structure-based traversal of the tree to construct a linear representation of the code language. Next, block 810 illustrates inputting the issue representation and code representation to the trained issue vector mode. Thereafter, block 812 illustrates recording the classification probability value, and the process passes to block 814.

Block 814 illustrates a determination whether there are additional previous code snippets in the training data that are not yet classified. At block 814, if there are additional previous code snippets in the training data that are not yet classified, then the process returns to block 816. At block 814, if there are not additional previous code snippets in the training data that are not yet classified, then the process passes to block 816. Block 816 illustrates selecting one or more previous code snippets with classification probabilities indicating a likelihood that the previous code snippet would resolve the new issue. Next, block 818 illustrates returning the selected one or more previous code snippets as recommended code snippets for resolving the new issue, and the process ends.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method comprising:
    receiving, by a computer, training data identifying a plurality of pairs, each pair identifying one or more separate code snippets known to resolve a respective issue of a plurality of issues;
    for each pair of the plurality of pairs:
        constructing, by the computer, a respective issue representation of core content of the respective issue;
        constructing, by the computer, a linear expression of the one or more separate code snippets in a respective code representation; and
        training, by the computer, a model to correlate the respective code representation as resolving the respective issue representation;
    applying, by the computer, natural language processing to a new issue to construct a new issue representation of core content of the new issue; and
    querying, by the computer, the model with the new issue representation and a selected one of the one or more separate code snippets via new issue representation; and
    determining, by the computer, whether the selected one or more separate code snippets resolve the new issue based at least in part on applying the structured based evaluation of a second abstract code syntax tree.

2. The method according to claim 1, wherein constructing, by the computer, the respective issue representation of core content of the respective issue, further comprises:
    applying, by the computer, natural language processing to the respective issue to construct the respective issue representation of core content of the respective issue.

3. The method according to claim 1, wherein constructing, by the computer, the linear expression of the one or more separate code snippets in the respective code representation, further comprises:
    applying, by the computer, a structured based evaluation of an abstract code syntax tree of the one or more separate code snippets to construct the linear expression in the respective code representation.

4. The method according to claim 1, wherein training, by the computer, the model to correlate the respective code representation as resolving the respective issue representation further comprises:
    passing, by the computer, the respective code representation to a code embedding network of the model to generate a first vector embedding;
    passing, by the computer, the respective issue representation to an issue embedding network of the model to generate a second vector embedding;
    training, by the computer, the model with a loss function to minimize loss based on the distance between the first vector embedding and the second vector embedding.

5. The method according to claim 4, wherein training, by the computer, the model with the loss function to minimize loss based on the distance between the first vector embedding and the second vector further comprises:
    training, by the computer, the model with the loss function to minimize loss based on the distance between the first vector embedding and the second vector, where the loss function produces a loss inverse to the distance between the first vector embedding and the second vector embedding if the code is not resolving the issue and produces a loss proportional to the distance between the first vector embedding and the second vector embedding if the code is resolving the issue.

6. The method according to claim 1, wherein querying, by the computer, the model with the new issue and the selected one of the one or more separate code snippets, wherein the model returns the classification indicating whether the selected one of the one or more separate code snippets is likely to resolve the new issue further comprises:
    selecting, by the computer, the selected one of the one or more separate code snippets;
    applying, by the computer, the structured based evaluation of a second abstract code syntax tree of the selected one of the one or more separate code snippets to construct a linear expression in a previous code representation;
    querying, by the computer, the model with the new issue representation and the previous code representation; and
    receiving, by the computer, the classification indicating a probability value whether the selected one of the one or more separate code snippets is likely to resolve the new issue.

7. The method according to claim 1, further comprising:
    responsive to the classification indicating the selected one of the one or more separate code snippets is likely to resolve the new issue, returning, by the computer, the selected one of the one or more separate code snippets as a recommended code snippet for resolving the new issue.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
    program instructions to receive training data identifying a plurality of pairs, each pair identifying one or more separate code snippets known to resolve a respective issue of a plurality of issues;
    for each pair of the plurality of pairs:
        program instructions to construct a respective issue representation of core content of the respective issue;
        program instructions to construct a linear expression of the one or more separate code snippets in a respective code representation; and
        program instructions to train a model to correlate the respective code representation as resolving the respective issue representation;
    program instructions to apply natural language processing to a new issue to construct a new issue representation of core content of the new issue; and
    program instructions to query the model with the new issue representation and a selected one of the one or more separate code snippets via a new issue representation; and program instructions to determine whether the selected one or more separate code snippets resolve the new issue based at least in part on applying the structured based evaluation of a second abstract code syntax tree.

9. The system according to claim 8, the program instructions to construct the respective issue representation of core content of the respective issue further comprising:
program instructions to apply natural language processing to the respective issue to construct the respective issue representation of core content of the respective issue.

10. The system according to claim 8, the program instructions to construct the linear expression of the one or more separate code snippets in the respective code representation further comprising:
program instructions to apply a structured based evaluation of an abstract code syntax tree of the one or more separate code snippets to construct the linear expression in the respective code representation.

11. The system according to claim 8, the program instructions to train the model to correlate the respective code representation as resolving the respective issue representation further comprising:
program instructions to pass the respective code representation to a code embedding network of the model to generate a first vector embedding;
program instructions to pass the respective issue representation to an issue embedding network of the model to generate a second vector embedding;
program instructions to train the model with a loss function to minimize loss based on the distance between the first vector embedding and the second vector embedding.

12. The system according to claim 11, the program instructions to train the model with the loss function to minimize loss based on the distance between the first vector embedding and the second vector further comprising:
program instructions to train the model with the loss function to minimize loss based on the distance between the first vector embedding and the second vector, where the loss function produces a loss inverse to the distance between the first vector embedding and the second vector embedding if the code is not resolving the issue and produces a loss proportional to the distance between the first vector embedding and the second vector embedding if the code is resolving the issue.

13. The system according to claim 8, the program instructions to query the model with the new issue and the selected one of the one or more separate code snippets, wherein the model returns the classification indicating whether the selected one of the one or more separate code snippets is likely to resolve the new issue further comprising:
program instructions to select the selected one of the one or more separate code snippets;
program instructions to apply the structured based evaluation of a second abstract code syntax tree of the selected one of the one or more separate code snippets to construct a linear expression in a previous code representation;
program instructions to query the model with the new issue representation and the previous code representation; and
program instructions to receive the classification indicating a probability value whether the selected one of the one or more separate code snippets is likely to resolve the new issue.

14. The system according to claim 8, further comprising:
program instructions, responsive to the classification indicating the selected one of the one or more separate code snippets is likely to resolve the new issue, to return the selected one of the one or more separate code snippets as a recommended code snippet for resolving the new issue.

15. A computer program product comprises one or more computer readable storage media having program instructions collectively stored thereon, wherein the one or more computer readable storage media are not a transitory signal per se, the program instructions executable by a computer to cause the computer to:
receive, by a computer, training data identifying a plurality of pairs, each pair identifying one or more separate code snippets known to resolve a respective issue of a plurality of issues;
for each pair of the plurality of pairs:
construct, by the computer, a respective issue representation of core content of the respective issue;
construct, by the computer, a linear expression of the one or more separate code snippets in a respective code representation; and
train, by the computer, a model to correlate the respective code representation as resolving the respective issue representation;
apply, by the computer, natural language processing to a new issue to construct a new issue representation of core content of the new issue; and
query, by the computer, the model with the new issue representation and a selected one of the one or more separate code snippets via a new representation; and
determining, by the computer, whether the selected one or more separate code snippets resolve the new issue based at least in part on applying the structured based evaluation of a second abstract code syntax tree.

16. The computer program product according to claim 15, further comprising the program instructions executable by the computer to cause the computer to:
apply, by the computer, natural language processing to the respective issue to construct the respective issue representation of core content of the respective issue.

17. The computer program product according to claim 15, further comprising the program instructions executable by the computer to cause the computer to:
apply, by the computer, a structured based evaluation of an abstract code syntax tree of the one or more separate code snippets to construct the linear expression in the respective code representation.

18. The computer program product according to claim 15, further comprising the program instructions executable by the computer to cause the computer to:
pass, by the computer, the respective code representation to a code embedding network of the model to generate a first vector embedding;
pass, by the computer, the respective issue representation to an issue embedding network of the model to generate a second vector embedding;
train, by the computer, the model with a loss function to minimize loss based on the distance between the first vector embedding and the second vector embedding.

19. The computer program product according to claim 18, further comprising the program instructions executable by the computer to cause the computer to:
train, by the computer, the model with the loss function to minimize loss based on the distance between the first vector embedding and the second vector, where the loss function produces a loss inverse to the distance between the first vector embedding and the second vector embedding if the code is not resolving the issue and produces a loss proportional to the distance between the first vector embedding and the second vector embedding if the code is resolving the issue.

20. The computer program product according to claim 15, further comprising the program instructions executable by the computer to cause the computer to:

select, by the computer, the selected one of the one or more separate code snippets;

apply, by the computer, the structured based evaluation of a second abstract code syntax tree of the selected one of the one or more separate code snippets to construct a linear expression in a previous code representation;

query, by the computer, the model with the new issue representation and the previous code representation; and receive, by the computer, the classification indicating a probability value whether the selected one of the one or more separate code snippets is likely to resolve the new issue.

\* \* \* \* \*